United States Patent
Kurian

(10) Patent No.: US 10,242,390 B2
(45) Date of Patent: Mar. 26, 2019

(54) DIGITAL DATA PROCESSING SYSTEM FOR CONTROLLING AUTOMATED EXCHANGE ZONE SYSTEMS

(71) Applicant: Bank of America Corporation, Charlotte, NC (US)

(72) Inventor: Manu Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 15/664,285

(22) Filed: Jul. 31, 2017

(65) Prior Publication Data

US 2019/0033809 A1    Jan. 31, 2019

(51) Int. Cl.
G06Q 30/02 (2012.01)
G06Q 30/06 (2012.01)
G06Q 30/00 (2012.01)
G05B 19/048 (2006.01)

(52) U.S. Cl.
CPC ....... *G06Q 30/0278* (2013.01); *G05B 19/048* (2013.01); *G06Q 30/018* (2013.01); *G06Q 30/0237* (2013.01); *G06Q 30/06* (2013.01); *G05B 2219/37569* (2013.01)

(58) Field of Classification Search
CPC .............................................. G06Q 30/0278
See application file for complete search history.

(56) References Cited

U.S. PATENT DOCUMENTS

| | | | | |
|---|---|---|---|---|
| 2001/0037207 A1* | 11/2001 | Dejaeger | ............... | G06Q 20/10 705/39 |
| 2006/0163342 A1* | 7/2006 | Carpenter | ............... | B65H 3/00 235/379 |
| 2008/0294530 A1* | 11/2008 | Ritsch | .................... | G06Q 30/06 705/26.1 |
| 2010/0088192 A1* | 4/2010 | Bowles | ................. | G06Q 10/30 705/26.1 |
| 2012/0030097 A1* | 2/2012 | Hagan | .................... | G06Q 20/10 705/39 |
| 2013/0198069 A1* | 8/2013 | Latimer | ................ | G06Q 40/02 705/42 |
| 2013/0284805 A1* | 10/2013 | Kraft | ....................... | G07F 11/62 235/381 |

(Continued)

*Primary Examiner* — Thomas Randazzo
(74) *Attorney, Agent, or Firm* — Banner & Witcoff, Ltd.; Michael A. Springs

(57) ABSTRACT

Aspects of the disclosure relate to controlling automated exchange zone systems using a digital data processing system. A computing platform may receive a notification indicating that an item has been received by an automated exchange zone system and may generate and send one or more item scan commands directing the automated exchange zone system to capture one or more scans of the item. Subsequently, the computing platform may receive item scan data captured by the automated exchange zone system and may evaluate the item scan data based on one or more templates. The computing platform may assign an item quality metric to the item and may generate, based on the item quality metric, one or more item processing commands directing the automated exchange zone system to process the item. Thereafter, the computing platform may send the one or more item processing commands to the automated exchange zone system.

19 Claims, 10 Drawing Sheets

(56) References Cited

U.S. PATENT DOCUMENTS

| | | | |
|---|---|---|---|
| 2014/0046842 A1* | 2/2014 | Irudayam | G07F 19/202 705/43 |
| 2014/0333761 A1* | 11/2014 | Porter | G06Q 30/06 348/135 |
| 2015/0012442 A1* | 1/2015 | Ceribelli | G06Q 20/1085 705/45 |
| 2015/0262119 A1* | 9/2015 | Santo, Jr. | G06Q 10/087 705/28 |
| 2016/0098689 A1* | 4/2016 | Bowles | G06Q 20/18 705/23 |
| 2016/0110724 A1* | 4/2016 | Seto | G06Q 30/018 705/318 |
| 2016/0171456 A1* | 6/2016 | Bowles | G06Q 10/30 705/23 |
| 2016/0191155 A1 | 6/2016 | Oshima et al. | |
| 2016/0195602 A1 | 7/2016 | Meadow | |
| 2016/0209648 A1 | 7/2016 | Haddick et al. | |
| 2016/0210602 A1 | 7/2016 | Siddique et al. | |
| 2016/0218806 A1 | 7/2016 | Oshima et al. | |
| 2016/0226308 A1 | 8/2016 | Valin et al. | |
| 2016/0232767 A1* | 8/2016 | Yang | G08B 13/2434 |
| 2016/0241338 A1 | 8/2016 | Ganick et al. | |
| 2016/0241707 A1 | 8/2016 | Lee et al. | |
| 2016/0241998 A1 | 8/2016 | Choi et al. | |
| 2016/0253651 A1 | 9/2016 | Park et al. | |
| 2016/0253670 A1 | 9/2016 | Kim et al. | |
| 2016/0266939 A1 | 9/2016 | Shear et al. | |
| 2016/0268833 A1 | 9/2016 | Lee et al. | |
| 2016/0269608 A1 | 9/2016 | Oshima et al. | |
| 2016/0283898 A1 | 9/2016 | Reuther et al. | |
| 2016/0288905 A1 | 10/2016 | Gong et al. | |
| 2016/0292403 A1 | 10/2016 | Gong et al. | |
| 2016/0292696 A1 | 10/2016 | Gong et al. | |
| 2016/0295038 A1 | 10/2016 | Rao et al. | |
| 2016/0308768 A1 | 10/2016 | Yoon et al. | |
| 2016/0328660 A1 | 11/2016 | Huang | |
| 2016/0344917 A1 | 11/2016 | Oshima et al. | |
| 2016/0344925 A1 | 11/2016 | Jeong | |
| 2016/0352421 A1 | 12/2016 | Oshima et al. | |
| 2016/0355339 A1 | 12/2016 | Peng | |
| 2016/0357473 A1 | 12/2016 | Kim et al. | |
| 2016/0361678 A1 | 12/2016 | Blackley | |
| 2016/0364087 A1 | 12/2016 | Thompson et al. | |
| 2016/0365825 A1 | 12/2016 | Poivet | |
| 2016/0381202 A1 | 12/2016 | Koo et al. | |
| 2016/0381621 A1 | 12/2016 | Kim et al. | |
| 2017/0004485 A1 | 1/2017 | Lee et al. | |
| 2017/0004588 A1 | 1/2017 | Isaacson et al. | |
| 2017/0011606 A1 | 1/2017 | Ceccon et al. | |
| 2017/0027168 A1 | 2/2017 | Heath | |
| 2017/0032114 A1 | 2/2017 | Turgeman | |
| 2017/0041073 A1 | 2/2017 | Oshima et al. | |
| 2017/0048240 A1 | 2/2017 | Chang et al. | |
| 2017/0054888 A1 | 2/2017 | Oshima et al. | |
| 2017/0064498 A1 | 3/2017 | Manges | |
| 2017/0080346 A1 | 3/2017 | Abbas | |
| 2017/0099102 A1 | 4/2017 | Oshima et al. | |
| 2017/0103204 A1 | 4/2017 | Mitola, III | |
| 2017/0104533 A1 | 4/2017 | Oshima et al. | |
| 2017/0111564 A1 | 4/2017 | Oshima et al. | |
| 2017/0131964 A1 | 5/2017 | Baek et al. | |
| 2017/0160813 A1 | 6/2017 | Divakaran et al. | |
| 2017/0163513 A1 | 6/2017 | Kim et al. | |
| 2017/0168566 A1 | 6/2017 | Osterhout et al. | |
| 2017/0182419 A1 | 6/2017 | Litos et al. | |
| 2017/0301035 A1* | 10/2017 | Bowles | G06Q 10/00 |

\* cited by examiner

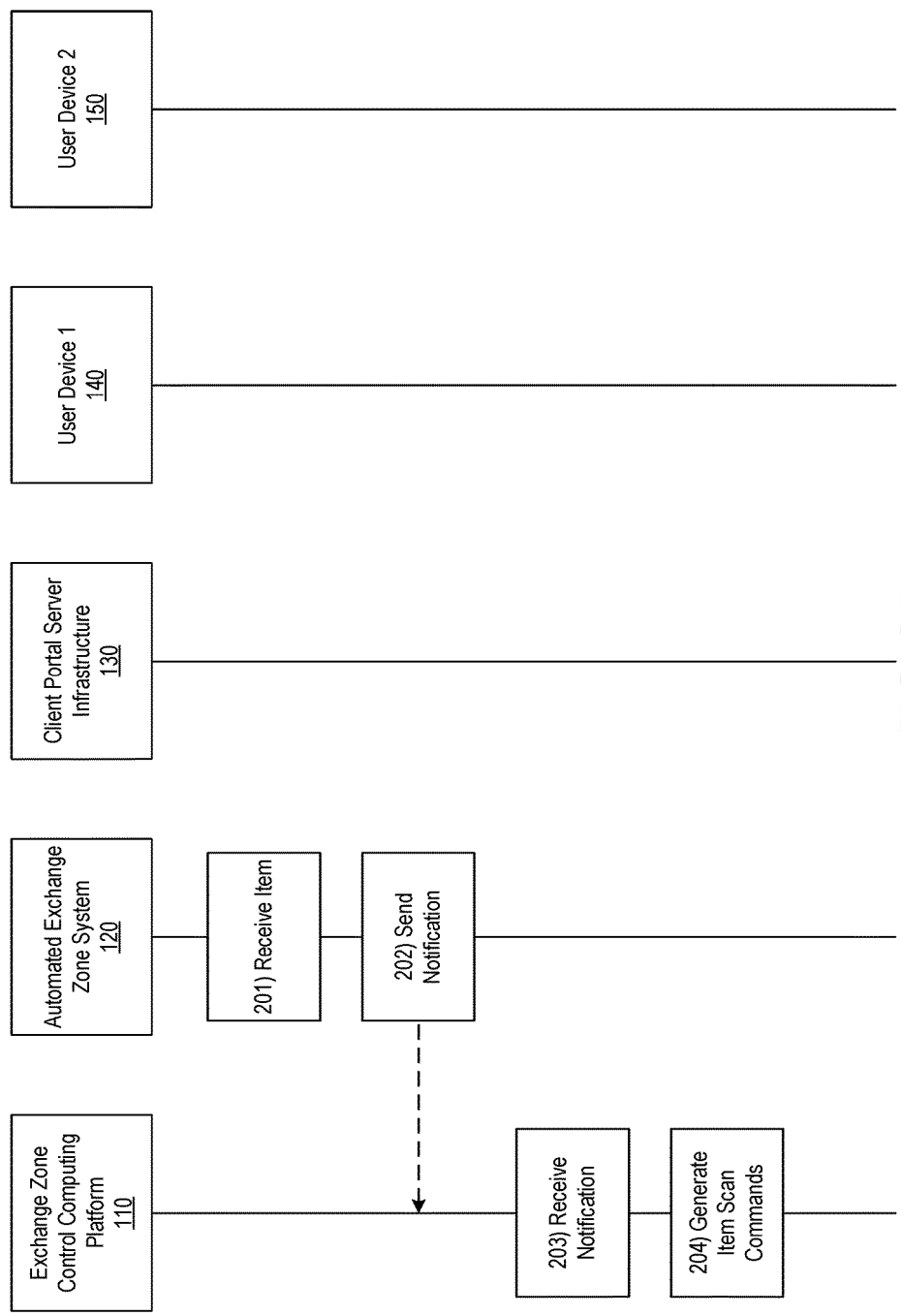

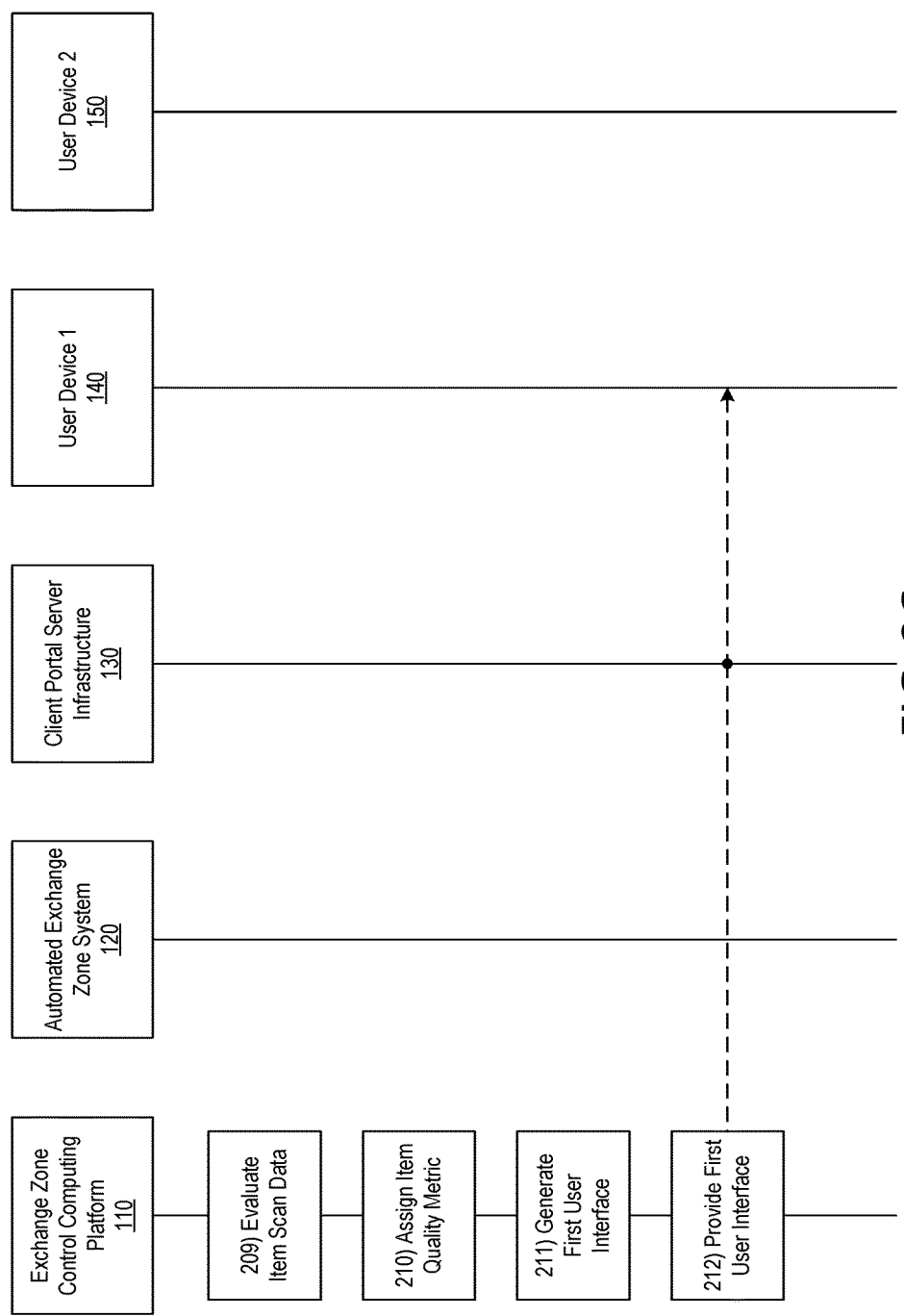

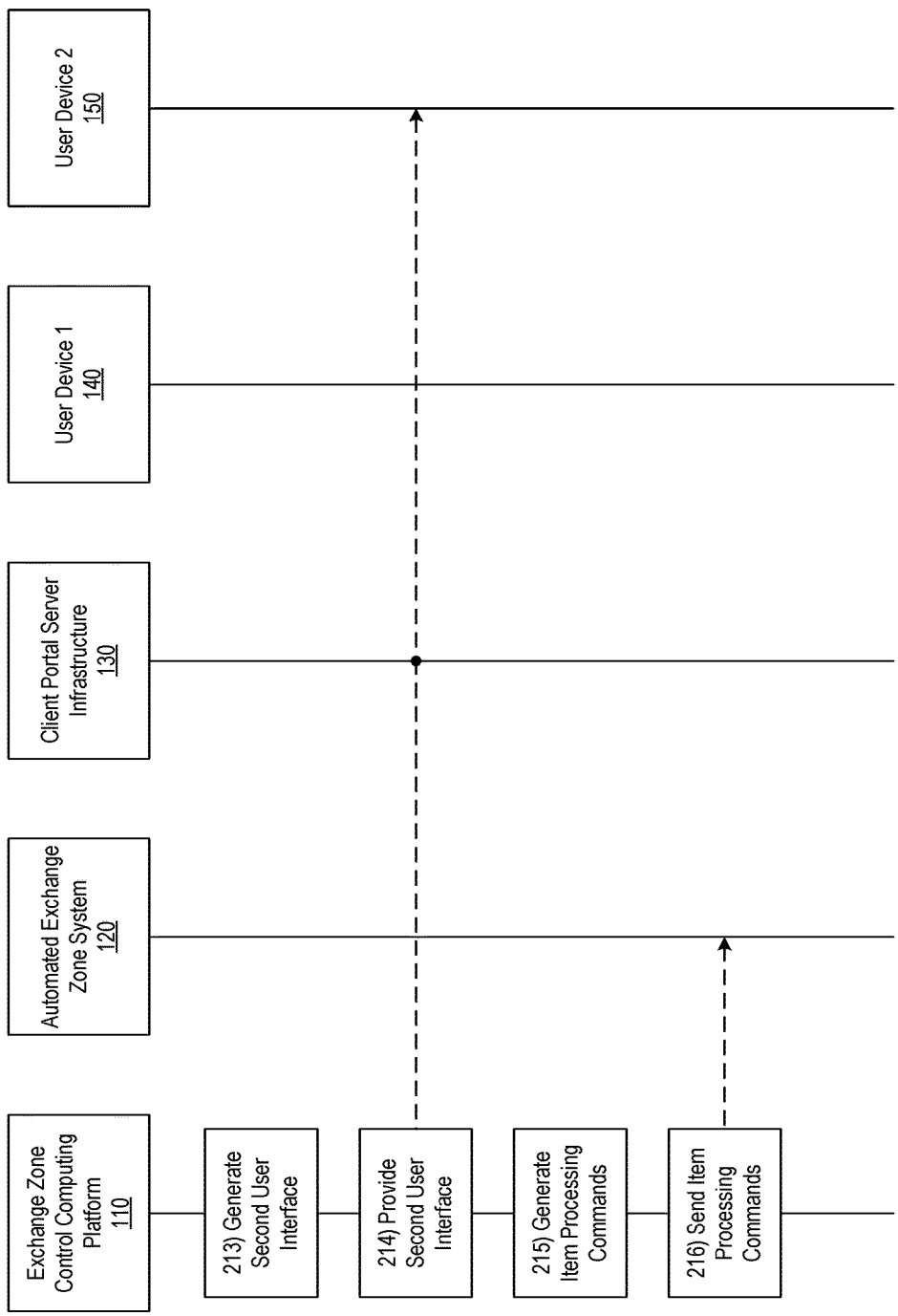

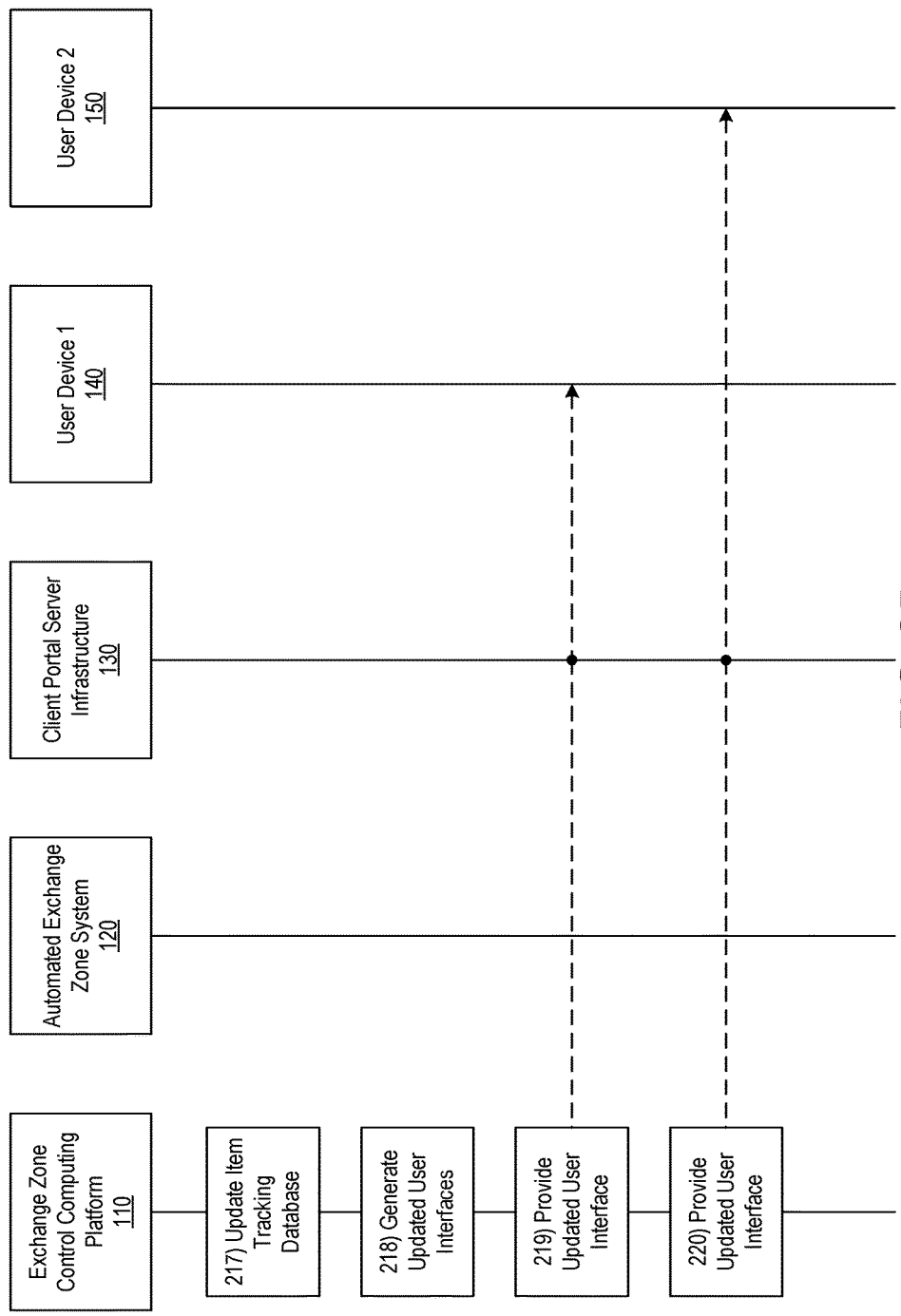

DIGITAL DATA PROCESSING SYSTEM FOR CONTROLLING AUTOMATED EXCHANGE ZONE SYSTEMS

BACKGROUND

Aspects of the disclosure relate to digital data processing systems and controlling automation systems. In particular, one or more aspects of the disclosure relate to controlling automated exchange zone systems using a digital data processing system.

Technological advances in robotics and automation are enabling new types of interactions and usage models. As such technologies are increasingly deployed, however, it may be difficult to centrally control and manage what functions are provided by such systems and how such technologies are used by different users, particularly in instances where such technologies are integrated with legacy and/or existing enterprise infrastructure, such as enterprise-specific user account portals.

SUMMARY

Aspects of the disclosure provide effective, efficient, scalable, and convenient technical solutions that address and overcome the technical problems associated with deploying automation technology and integrating such technology with other enterprise computing infrastructure. In particular, one or more aspects of the disclosure relate to controlling automated exchange zone systems using a digital data processing system.

In accordance with one or more embodiments, a computing platform having at least one processor, a memory, and a communication interface may receive, via the communication interface, from an automated exchange zone system, a notification indicating that an item has been received by the automated exchange zone system from a first user of the automated exchange zone system. In response to receiving the notification indicating that the item has been received by the automated exchange zone system, the computing platform may generate one or more item scan commands directing the automated exchange zone system to capture one or more scans of the item received by the automated exchange zone system from the first user of the automated exchange zone system. Subsequently, the computing platform may send, via the communication interface, to the automated exchange zone system, the one or more item scan commands directing the automated exchange zone system to capture the one or more scans of the item received by the automated exchange zone system from the first user of the automated exchange zone system.

After sending the one or more item scan commands to the automated exchange zone system, the computing platform may receive, via the communication interface, from the automated exchange zone system, item scan data captured by the automated exchange zone system. Subsequently, the computing platform may evaluate the item scan data received from the automated exchange zone system based on one or more item analysis templates maintained by the computing platform. Based on evaluating the item scan data received from the automated exchange zone system, the computing platform may assign an item quality metric to the item received by the automated exchange zone system from the first user of the automated exchange zone system. Thereafter, the computing platform may generate, based on the item quality metric assigned to the item received by the automated exchange zone system from the first user of the automated exchange zone system, one or more item processing commands directing the automated exchange zone system to process the item received by the automated exchange zone system from the first user of the automated exchange zone system. Then, the computing platform may send, via the communication interface, to the automated exchange zone system, the one or more item processing commands directing the automated exchange zone system to process the item received by the automated exchange zone system from the first user of the automated exchange zone system.

In some embodiments, generating the one or more item scan commands directing the automated exchange zone system to capture the one or more scans of the item received by the automated exchange zone system from the first user of the automated exchange zone system may include generating at least one item scan command directing the automated exchange zone system to capture a three-dimensional scan of the item received by the automated exchange zone system from the first user of the automated exchange zone system.

In some embodiments, generating the one or more item scan commands directing the automated exchange zone system to capture the one or more scans of the item received by the automated exchange zone system from the first user of the automated exchange zone system may include generating at least one item scan command directing the automated exchange zone system to capture an infrared scan of the item received by the automated exchange zone system from the first user of the automated exchange zone system.

In some embodiments, generating the one or more item scan commands directing the automated exchange zone system to capture the one or more scans of the item received by the automated exchange zone system from the first user of the automated exchange zone system may include generating at least one item scan command directing the automated exchange zone system to capture an x-ray scan of the item received by the automated exchange zone system from the first user of the automated exchange zone system.

In some embodiments, receiving the item scan data captured by the automated exchange zone system may include receiving scan data identifying one or more physical features of the item received by the automated exchange zone system from the first user of the automated exchange zone system.

In some embodiments, evaluating the item scan data received from the automated exchange zone system based on the one or more item analysis templates maintained by the computing platform may include evaluating the item scan data received from the automated exchange zone system based on external data associated with an external data source system.

In some embodiments, generating the one or more item processing commands directing the automated exchange zone system to process the item received by the automated exchange zone system from the first user of the automated exchange zone system may include generating at least one item processing command directing the automated exchange zone system to tag the item received by the automated exchange zone system from the first user of the automated exchange zone system.

In some embodiments, generating the one or more item processing commands directing the automated exchange zone system to process the item received by the automated exchange zone system from the first user of the automated exchange zone system may include generating at least one item processing command directing the automated exchange zone system to dispense the item received by the automated exchange zone system from the first user of the automated exchange zone system.

In some embodiments, generating the one or more item processing commands directing the automated exchange zone system to process the item received by the automated exchange zone system from the first user of the automated exchange zone system may include generating at least one item processing command directing the automated exchange zone system to hold the item received by the automated exchange zone system from the first user of the automated exchange zone system.

In some embodiments, after sending the one or more item processing commands to the automated exchange zone system, the computing platform may update an item tracking database based on the one or more item processing commands sent to the automated exchange zone system.

In some embodiments, after assigning the item quality metric to the item received by the automated exchange zone system from the first user of the automated exchange zone system, the computing platform may generate a first user interface for a first computing device linked to the first user of the automated exchange zone system. Subsequently, the computing platform may provide, via the communication interface, to the first computing device linked to the first user of the automated exchange zone system, the first user interface.

In some embodiments, after providing the first user interface to the first computing device linked to the first user of the automated exchange zone system, the computing platform may generate a second user interface for a second computing device linked to a second user of the automated exchange zone system different from the first user of the automated exchange zone system. Subsequently, the computing platform may provide, via the communication interface, to the second computing device linked to the second user of the automated exchange zone system, the second user interface.

In some embodiments, after sending the one or more item processing commands to the automated exchange zone system, the computing platform may provide, via the communication interface, to the first computing device linked to the first user of the automated exchange zone system, a first updated user interface. In addition, the computing platform may provide, via the communication interface, to the second computing device linked to the second user of the automated exchange zone system, a second updated user interface.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A, 2B, 2C, 2D, and 2E depict an illustrative event sequence for controlling automated exchange zone systems using a digital data processing system in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
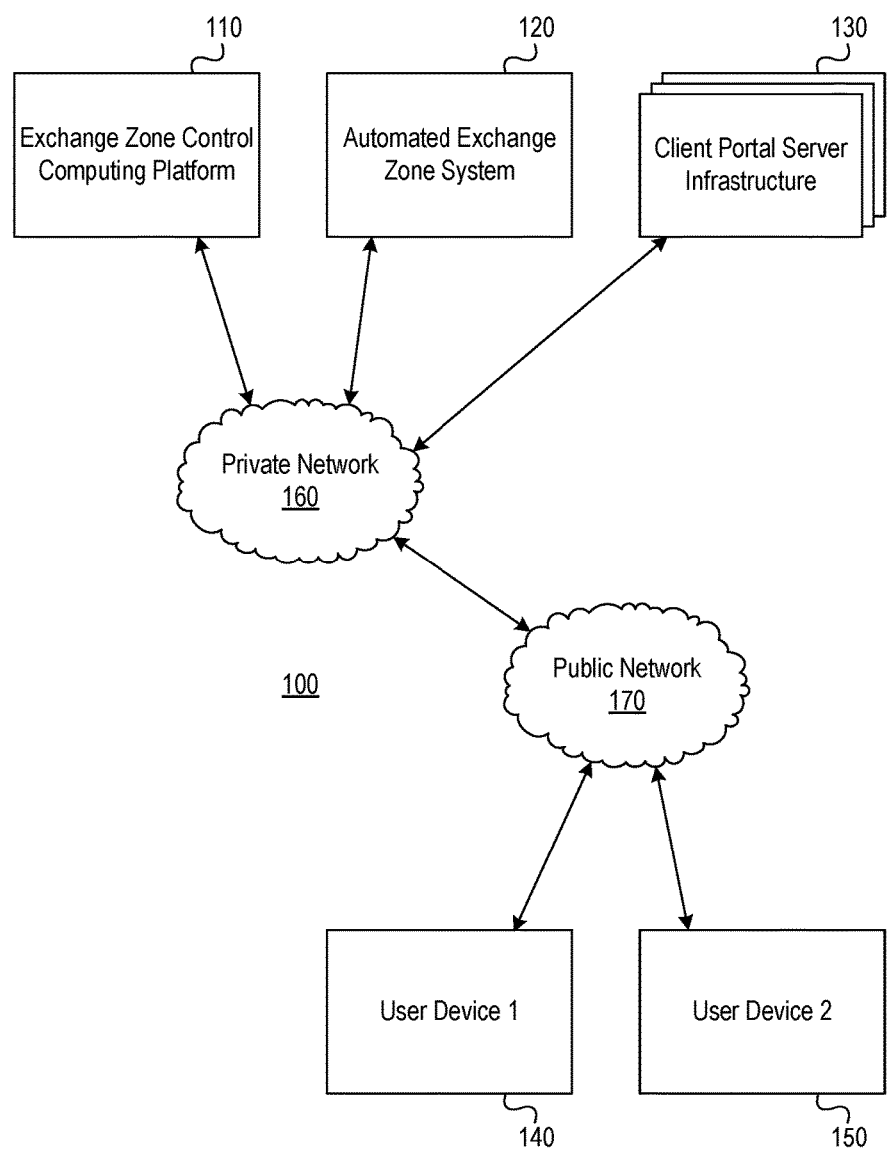
FIGS. 1A and 1B depict an illustrative computing environment for controlling automated exchange zone systems using a digital data processing system in accordance with one or more example embodiments.
Figure 1B:
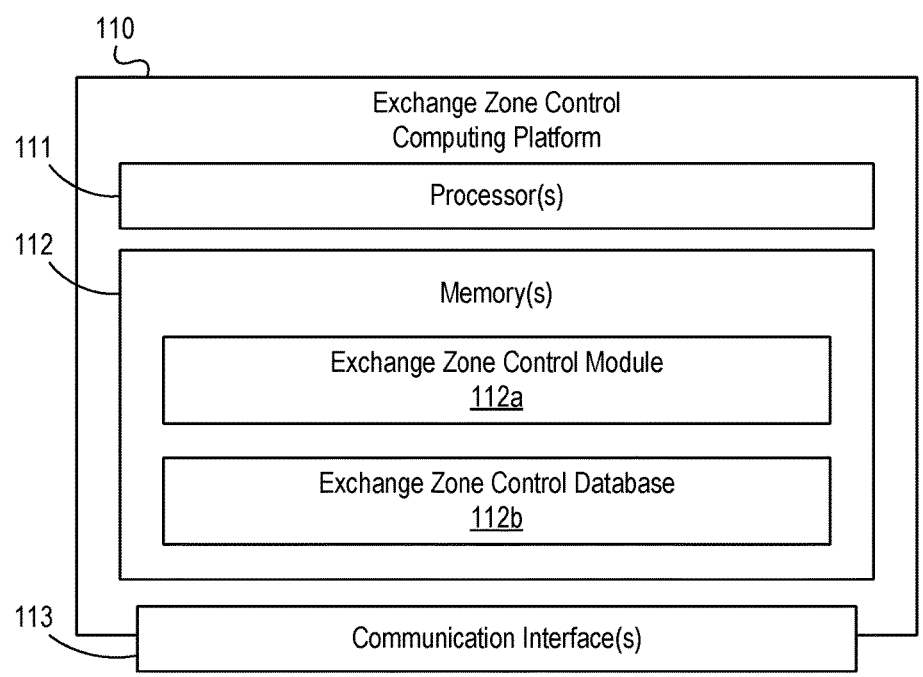

FIGS. 1A and 1B depict an illustrative computing environment for controlling automated exchange zone systems using a digital data processing system in accordance with one or more example embodiments. Referring to FIG. 1A, computing environment 100 may include one or more computer systems. For example, computing environment 100 may include an exchange zone control computing platform 110, an automated exchange zone system 120, client portal server infrastructure 130, a first user computing device 140, and a second user computing device 150.

As illustrated in greater detail below, exchange zone control computing platform 110 may include one or more computing devices configured to perform one or more of the functions described herein. For example, exchange zone control computing platform 110 may include one or more computers (e.g., laptop computers, desktop computers, servers, server blades, or the like).

Automated exchange zone system 120 may include one or more computer components (e.g., processors, memories, communication interfaces) and further may include and/or be connected to one or more robotic systems and/or automation systems. For example, automated exchange zone system 120 may include and/or be connected to one or more robotic arms, cameras, x-ray scanners, and/or other components that may be computer-controlled by automated exchange zone system 120. In one or more arrangements, such components may, for instance, enable automated exchange zone system 120 to physically receive one or more physical items (e.g., laptops, smart phones, other consumer items, non-consumer items, and/or the like) from one or more users of automated exchange zone system 120. In addition, automated exchange zone system 120 may be configured to analyze and/or otherwise evaluate such physical items, as discussed in greater detail below. Automated exchange zone system 120 also may include one or more electrically-actuated storage compartments in which automated exchange zone system 120 may physically store such items. In some instances, automated exchange zone system 120 may interface with one or more other systems in computing environment 100, such as exchange zone control computing platform 110, to facilitate the exchange of physical items received by automated exchange zone system 120, as discussed in greater detail below. Additionally, automated exchange zone system 120 may include one or more electrically-actuated dispensing components via which automated exchange zone system 120 may dispense and/or otherwise physically output such physical items to one or more users of automated exchange zone system 120.

Client portal server infrastructure 130 may include a plurality of computer servers and other computing infrastructure. In some instances, client portal server infrastructure 130 may be configured to provide a client portal, such as an online banking portal and/or a mobile banking portal, to one or more customers of an organization operating exchange zone control computing platform 110 and/or client portal server infrastructure 130, such as one or more customers of a financial institution operating exchange zone control computing platform 110 and/or client portal server infrastructure 130, who may use one or more client computing devices to access the portal and/or who may be authenticated to one or more portal user accounts by one or more servers included in computing environment 100 based on user profile information, user authentication preferences information, and/or other user information associated with the organization operating exchange zone control computing platform 110 and/or client portal server infrastructure 130. In instances in which the organization operating exchange zone control computing platform 110 and/or client portal server infrastructure 130 is a financial institution, such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like). Additionally or alternatively, such portals may provide customers of the financial institution operating exchange zone control computing platform 110 and/or client portal server infrastructure 130 with access to user interfaces via which they can sell, purchase, and/or otherwise exchange one or more physical items with other individuals using one or more automated exchange zones, such as an automated exchange zone associated with automated exchange zone system 120, as discussed in greater detail below.

User computing device 140 may be a personal computing device (e.g., desktop computer, laptop computer) or mobile computing device (e.g., smartphone, tablet, wearable device) that may be linked to and/or used by a first user (who may, e.g., be a client of an organization operating exchange zone control computing platform 110 and/or client portal server infrastructure 130). User computing device 150 also may be a personal computing device (e.g., desktop computer, laptop computer) or mobile computing device (e.g., smartphone, tablet, wearable device) that may be linked to and/or used by a second user (who may, e.g., be a client of an organization operating exchange zone control computing platform 110 and/or client portal server infrastructure 130) different from the first user.

Computing environment 100 also may include one or more networks, which may interconnect one or more of exchange zone control computing platform 110, automated exchange zone system 120, client portal server infrastructure 130, user computing device 140, and user computing device 150. For example, computing environment 100 may include a private network 160 (which may, e.g., interconnect exchange zone control computing platform 110, automated exchange zone system 120, client portal server infrastructure 130, and/or one or more other systems associated with an organization operating exchange zone control computing platform 110, automated exchange zone system 120, and/or client portal server infrastructure 130) and public network 170 (which may, e.g., interconnect user computing device 140, user computing device 150, and/or one or more other systems, public networks, sub-networks, and/or the like).

In one or more arrangements, user computing device 140 and user computing device 150 and/or the other systems included in computing environment 100 may be any type of computing device capable of receiving a user interface, receiving input via the user interface, and communicating the received input to one or more other computing devices. For example, user computing device 140 and user computing device 150 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of exchange zone control computing platform 110, automated exchange zone system 120, client portal server infrastructure 130, user computing device 140, and user computing device 150 may, in some instances, be special-purpose computing devices configured to perform specific functions.

Referring to FIG. 1B, exchange zone control computing platform 110 may include one or more processors 111, memory 112, and communication interface 113. A data bus may interconnect processor 111, memory 112, and communication interface 113. Communication interface 113 may be a network interface configured to support communication between exchange zone control computing platform 110 and one or more networks (e.g., network 160, network 170, or the like). Memory 112 may include one or more program modules having instructions that when executed by processor 111 cause exchange zone control computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of exchange zone control computing platform 110 and/or by different computing devices that may form and/or otherwise make up exchange zone control computing platform 110. For example, memory 112 may have, store, and/or include an exchange zone control module 112*a* and an exchange zone control database 112*b*. Exchange zone control module 112*a* may have instructions that direct and/or cause exchange zone control computing platform 110 to manage and/or control one or more automated exchange zones and/or associated systems, as discussed in greater detail below. Exchange zone control database 112*b* may store information used by exchange zone control module 112*a* and/or exchange zone control computing platform 110 in managing and/or controlling one or more automated exchange zones and/or associated systems and/or in performing other functions.

Figure 2B:
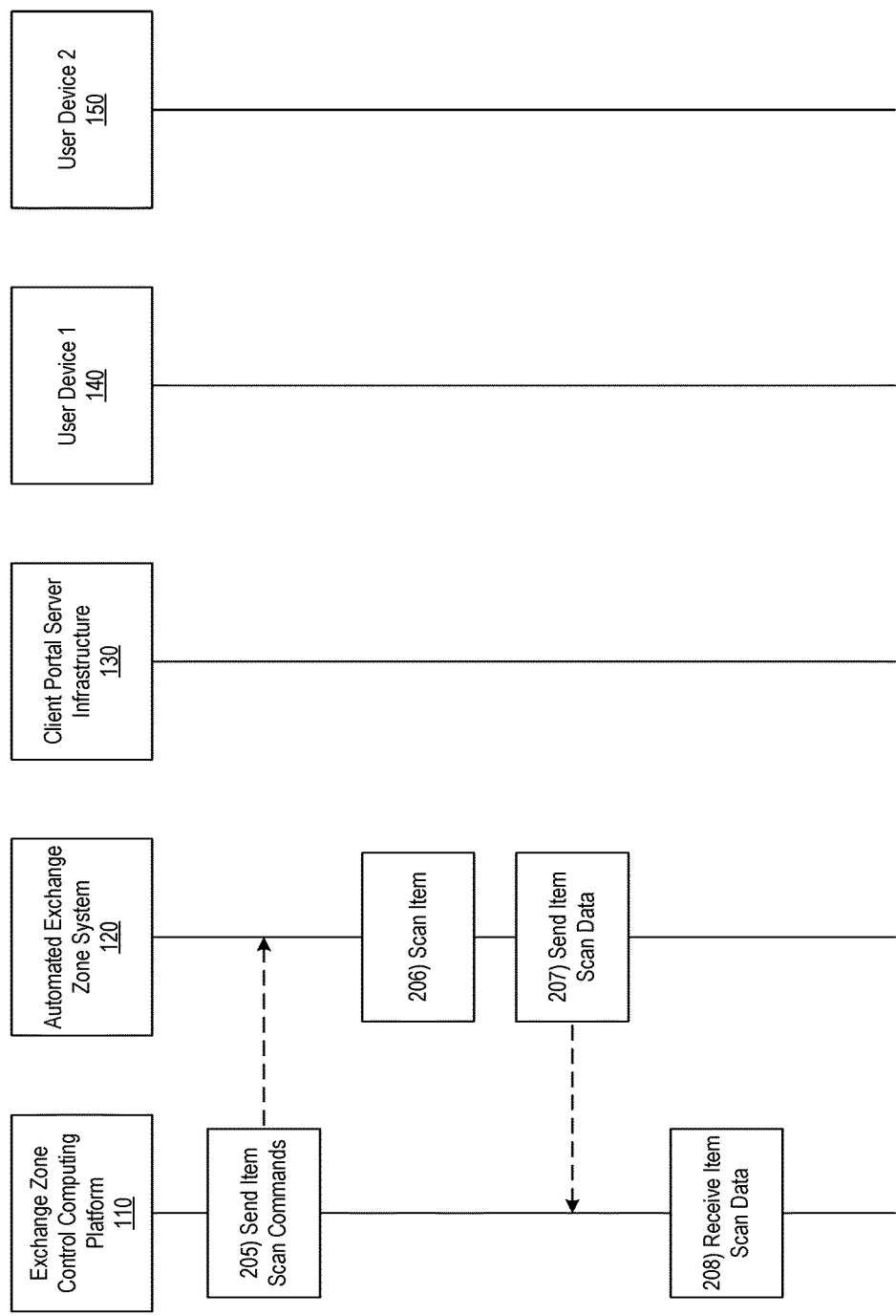

FIGS. 2A, 2B, 2C, 2D, and 2E depict an illustrative event sequence for controlling automated exchange zone systems using a digital data processing system in accordance with one or more example embodiments. Referring to FIG. 2A, at step 201, automated exchange zone system 120 may receive an item. For example, at step 201, automated exchange zone system 120 may receive a physical item (e.g., to be sold or exchanged using automated exchange zone system 120) from a first user of automated exchange zone system 120. In some instances, automated exchange zone system 120 may physically transport and store the received item in a specific examination bay or storage compartment after receiving the item. In some examples, the item received by automated exchange zone system 120 may be a consumer item (e.g., a laptop to be sold, a smartphone to be sold, or the like) or a non-consumer item (e.g., construction supplies, raw materials, timber, flooring, tiles, or the like). At step 202, automated exchange zone system 120 may generate and send a notification to exchange zone control computing platform 110. For example, in response to receiving the item at step 201, automated exchange zone system 120 may generate and send, to exchange zone control computing platform 110, a notification indicating that automated exchange zone system 120 has received the item, as well as any other information associated with the item that is available to automated exchange zone system 120.

At step 203, exchange zone control computing platform 110 may receive the notification from automated exchange zone system 120. For instance, exchange zone control computing platform 110 may establish a network connection with automated exchange zone system 120, and exchange zone control computing platform 110 may receive the notification via the network connection while the network connection is established. For example, at step 203, exchange zone control computing platform 110 may receive, via the communication interface (e.g., communication interface 113), from an automated exchange zone system (e.g., automated exchange zone system 120), a notification indicating that an item has been received by the automated exchange zone system (e.g., automated exchange zone system 120) from a first user of the automated exchange zone system (e.g., automated exchange zone system 120).

At step 204, exchange zone control computing platform 110 may generate one or more item scan commands (which may, e.g., include instructions and/or other information to be executed and/or otherwise used by automated exchange zone system 120). For example, at step 204, in response to receiving the notification indicating that the item has been received by the automated exchange zone system (e.g., automated exchange zone system 120), exchange zone control computing platform 110 may generate one or more item scan commands directing the automated exchange zone system (e.g., automated exchange zone system 120) to capture one or more scans of the item received by the automated exchange zone system (e.g., automated exchange zone system 120) from the first user of the automated exchange zone system (e.g., automated exchange zone system 120).

In some embodiments, generating the one or more item scan commands directing the automated exchange zone system to capture the one or more scans of the item received by the automated exchange zone system from the first user of the automated exchange zone system may include generating at least one item scan command directing the automated exchange zone system to capture a three-dimensional scan of the item received by the automated exchange zone system from the first user of the automated exchange zone system. For example, in generating the one or more item scan commands directing the automated exchange zone system (e.g., automated exchange zone system 120) to capture the one or more scans of the item received by the automated exchange zone system (e.g., automated exchange zone system 120) from the first user of the automated exchange zone system (e.g., automated exchange zone system 120), exchange zone control computing platform 110 may generate at least one item scan command directing the automated exchange zone system (e.g., automated exchange zone system 120) to capture a three-dimensional scan of the item received by the automated exchange zone system (e.g., automated exchange zone system 120) from the first user of the automated exchange zone system (e.g., automated exchange zone system 120). Automated exchange zone system 120 subsequently may capture such a scan (e.g., after receiving the one or more item scan commands from exchange zone control computing platform 110) using one or more three-dimensional cameras and/or other sensors included in and/or connected to automated exchange zone system 120.

In some embodiments, generating the one or more item scan commands directing the automated exchange zone system to capture the one or more scans of the item received by the automated exchange zone system from the first user of the automated exchange zone system may include generating at least one item scan command directing the automated exchange zone system to capture an infrared scan of the item received by the automated exchange zone system from the first user of the automated exchange zone system. For example, in generating the one or more item scan commands directing the automated exchange zone system (e.g., automated exchange zone system 120) to capture the one or more scans of the item received by the automated exchange zone system (e.g., automated exchange zone system 120) from the first user of the automated exchange zone system (e.g., automated exchange zone system 120), exchange zone control computing platform 110 may generate at least one item scan command directing the automated exchange zone system (e.g., automated exchange zone system 120) to capture an infrared scan of the item received by the automated exchange zone system (e.g., automated exchange zone system 120) from the first user of the automated exchange zone system (e.g., automated exchange zone system 120). Automated exchange zone system 120 subsequently may capture such a scan (e.g., after receiving the one or more item scan commands from exchange zone control computing platform 110) using one or more infrared cameras and/or other sensors included in and/or connected to automated exchange zone system 120.

In some embodiments, generating the one or more item scan commands directing the automated exchange zone system to capture the one or more scans of the item received by the automated exchange zone system from the first user of the automated exchange zone system may include generating at least one item scan command directing the automated exchange zone system to capture an x-ray scan of the item received by the automated exchange zone system from the first user of the automated exchange zone system. For example, in generating the one or more item scan commands directing the automated exchange zone system (e.g., automated exchange zone system 120) to capture the one or more scans of the item received by the automated exchange zone system (e.g., automated exchange zone system 120) from the first user of the automated exchange zone system (e.g., automated exchange zone system 120), exchange zone control computing platform 110 may generate at least one item scan command directing the automated exchange zone system (e.g., automated exchange zone system 120) to capture an x-ray scan of the item received by the automated exchange zone system (e.g., automated exchange zone system 120) from the first user of the automated exchange zone system (e.g., automated exchange zone system 120). Automated exchange zone system 120 subsequently may capture such a scan (e.g., after receiving the one or more item scan commands from exchange zone control computing platform 110) using one or more x-ray cameras and/or other sensors included in and/or connected to automated exchange zone system 120. In some instances, such an x-ray scan might only indicate a two-dimensional view of the item received by automated exchange zone system 120. In these instances, a user of automated exchange zone system 120 may be provided with an option to create a multi-layered and/or three-dimensional representation of the item received by automated exchange zone system 120. In addition, a user of automated exchange zone system 120 may be able to interact with the multi-layered and/or three-dimensional representation of the item received by automated exchange zone system 120 using augmented and/or virtual reality functions provided by automated exchange zone system 120 and/or one or more other computer systems.

Referring to FIG. 2B, at step 205, exchange zone control computing platform 110 may send the generated item scan command(s) to automated exchange zone system 120. For example, at step 205, exchange zone control computing platform 110 may send, via the communication interface (e.g., communication interface 113), to the automated exchange zone system (e.g., automated exchange zone system 120), the one or more item scan commands directing the automated exchange zone system (e.g., automated exchange zone system 120) to capture the one or more scans of the item received by the automated exchange zone system (e.g., automated exchange zone system 120) from the first user of the automated exchange zone system (e.g., automated exchange zone system 120). In one or more arrangements, by sending the generated item scan command(s) to automated exchange zone system 120, exchange zone control computing platform 110 may cause automated exchange zone system 120 to execute the item scan command(s) generated by exchange zone control computing platform 110.

At step 206, automated exchange zone system 120 may scan the item. For instance, at step 206, automated exchange zone system 120 may scan the item based on the command(s) generated by and received from exchange zone control computing platform 110. In addition, in scanning the item, automated exchange zone system 120 may capture item scan data associated with the item (e.g., from one or more cameras and/or other sensors included in and/or connected to automated exchange zone system 120 and/or otherwise used by automated exchange zone system 120 to scan the item). At step 207, automated exchange zone system 120 may send item scan data to exchange zone control computing platform 110. For instance, at step 207, automated exchange zone system 120 may send, to exchange zone control computing platform 110, the item scan data captured by automated exchange zone system 120 and/or the one or more cameras and/or other sensors included in and/or connected to automated exchange zone system 120 and used by automated exchange zone system 120 in scanning the item.

At step 208, exchange zone control computing platform 110 may receive, from automated exchange zone system 120, the item scan data (which may, e.g., have been captured by automated exchange zone system 120 and/or the one or more cameras and/or other sensors included in and/or connected to automated exchange zone system 120). For example, at step 208, after sending the one or more item scan commands to the automated exchange zone system (e.g., automated exchange zone system 120), exchange zone control computing platform 110 may receive, via the communication interface (e.g., communication interface 113), from the automated exchange zone system (e.g., automated exchange zone system 120), item scan data captured by the automated exchange zone system (e.g., automated exchange zone system 120).

In some embodiments, receiving the item scan data captured by the automated exchange zone system may include receiving scan data identifying one or more physical features of the item received by the automated exchange zone system from the first user of the automated exchange zone system. For example, in receiving the item scan data captured by the automated exchange zone system (e.g., automated exchange zone system 120), exchange zone control computing platform 110 may receive scan data identifying one or more physical features of the item received by the automated exchange zone system (e.g., automated exchange zone system 120) from the first user of the automated exchange zone system (e.g., automated exchange zone system 120). The scan data identifying one or more physical features of the item received by the automated exchange zone system (e.g., automated exchange zone system 120) may, for instance, include information identifying one or more internal physical attributes of the item (e.g., item density, item structure, item consistency, and/or the like) and/or information identifying one or more external physical attributes of the item (e.g., item color, item texture, item shape, and/or the like).

Referring to FIG. 2C, at step 209, exchange zone control computing platform 110 may evaluate the item scan data received from automated exchange zone system 120 (e.g., based on one or more templates maintained by exchange zone control computing platform 110, based on external data obtained by exchange zone control computing platform 110 from one or more other systems, and/or based on other information). For example, at step 209, exchange zone control computing platform 110 may evaluate the item scan data received from the automated exchange zone system (e.g., automated exchange zone system 120) based on one or more item analysis templates maintained by the computing platform (e.g., exchange zone control computing platform 110). In one or more arrangements, exchange zone control computing platform 110 may maintain different item analysis templates for different types of items that may be received by automated exchange zone system 120 and/or evaluated by exchange zone control computing platform 110. For instance, exchange zone control computing platform 110 may maintain one or more item analysis templates for evaluating different consumer goods (e.g., laptops, smartphones, or the like) and/or one or more item analysis templates for evaluating different non-consumer goods (e.g., construction supplies, raw materials, timber, flooring, tiles, or the like).

In some embodiments, evaluating the item scan data received from the automated exchange zone system based on the one or more item analysis templates maintained by the computing platform may include evaluating the item scan data received from the automated exchange zone system based on external data associated with an external data source system. For example, in evaluating the item scan data received from the automated exchange zone system (e.g., automated exchange zone system 120) based on the one or more item analysis templates maintained by the computing platform (e.g., exchange zone control computing platform 110), exchange zone control computing platform 110 may evaluate the item scan data received from the automated exchange zone system (e.g., automated exchange zone system 120) based on external data associated with an external data source system. For instance, exchange zone control computing platform 110 may retrieve the external data associated with the external data source system from the external data source system and subsequently use the external data in evaluating the item scan data. In some instances, the external data retrieved and/or used by exchange zone control computing platform 110 may include information identifying a current monetary value of the item received by automated exchange zone system 120, information identifying whether the specific item received by automated exchange zone system 120 is lost or stolen, and/or other information associated with the item received by automated exchange zone system 120.

At step 210, exchange zone control computing platform 110 may assign an item quality metric to the item received by automated exchange zone system 120 (e.g., based on the evaluation of the item scan data completed by exchange zone control computing platform 110). For example, at step 210, based on evaluating the item scan data received from the automated exchange zone system (e.g., automated exchange zone system 120), exchange zone control computing platform 110 may assign an item quality metric to the item received by the automated exchange zone system (e.g., automated exchange zone system 120) from the first user of the automated exchange zone system (e.g., automated exchange zone system 120). In some instances, a difference between the quality metric assigned to the item by exchange zone control computing platform 110 and a quality metric initially assigned to the item by the user selling the item may cause exchange zone control computing platform 110 to reduce the quoted price for the item. For example, if the user selling the item initially indicates that the item is "like new" but exchange zone control computing platform 110 determines that there is more damage than described and assigns a lower quality metric accordingly, exchange zone control computing platform 110 may reduce the quoted price for the item. In addition, exchange zone control computing platform 110 may advise the seller and/or the buyer(s) of the lower quality and may offer the seller an opportunity to adjust the price of the item. Additionally, exchange zone control computing platform 110 may provide the buyer(s) with the updated price and/or options to withdraw from the transaction, accept the new price, and/or the like.

At step 211, exchange zone control computing platform 110 may generate a first user interface for a user computing device linked to the first user of automated exchange zone system 120 (e.g., the user who deposited and/or otherwise provided the item received by automated exchange zone system 120). For example, at step 211, after assigning the item quality metric to the item received by the automated exchange zone system (e.g., automated exchange zone system 120) from the first user of the automated exchange zone system (e.g., automated exchange zone system 120), exchange zone control computing platform 110 may generate a first user interface for a first computing device (e.g., user computing device 140) linked to the first user of the automated exchange zone system (e.g., automated exchange zone system 120). For instance, the first user interface generated by exchange zone control computing platform 110 for user computing device 140 may include information confirming receipt of the item, information reporting the quality of the item as determined by automated exchange zone system 120 and/or exchange zone control computing platform 110, one or more controls enabling the user of user computing device 140 (who may, e.g., be putting the item up for sale) to specify one or more terms of sale for the item (e.g., by defining an item exchange agreement, by selecting a predefined item exchange agreement, such as an escrow agreement, and/or the like), and/or other controls and/or information.

Figure 3:
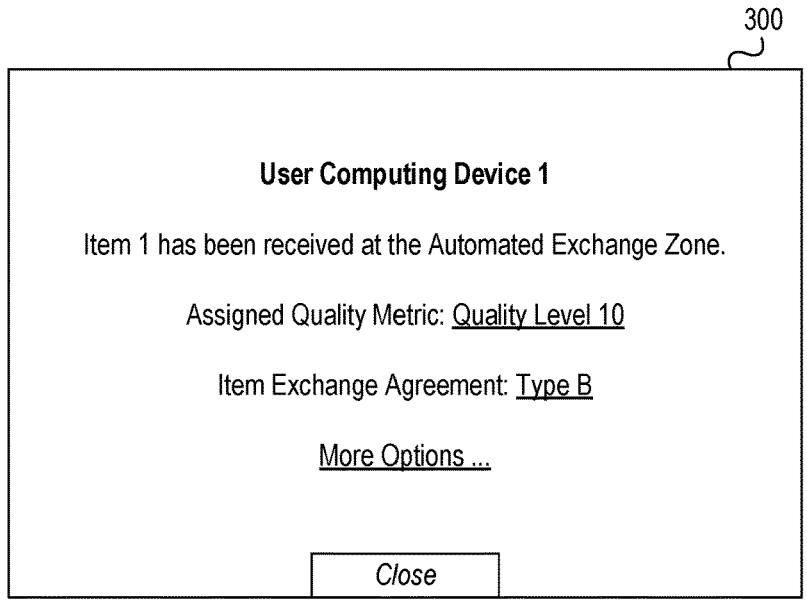
FIGS. 3, 4, 5, and 6 depict example graphical user interfaces for controlling automated exchange zone systems using a digital data processing system in accordance with one or more example embodiments.

At step 212, exchange zone control computing platform 110 may provide the first user interface to user computing device 140. For example, at step 212, exchange zone control computing platform 110 may provide, via the communication interface (e.g., communication interface 113), to the first computing device (e.g., user computing device 140) linked to the first user of the automated exchange zone system (e.g., automated exchange zone system 120), the first user interface. In some instances, in providing the first user interface and/or one or more other user interfaces to user computing device 140, exchange zone control computing platform 110 may provide the user interface(s) via a client portal provided to user computing device 140 by client portal server infrastructure 130, such as an online banking portal and/or a mobile banking portal. In these instances, exchange zone control computing platform 110 may send the user interface(s) to client portal server infrastructure 130, which in turn may send and/or otherwise provide the user interface(s) to user computing device 140. In some instances, in providing the first user interface and/or one or more other user interfaces to user computing device 140, exchange zone control computing platform 110 may cause user computing device 140 to display and/or otherwise present a graphical user interface similar to graphical user interface 300, which is illustrated in FIG. 3. As seen in FIG. 3, graphical user interface 300 may include information notifying the user of user computing device 140 that the item has been received at automated exchange zone system 120, information notifying the user of the quality metric assigned to the item by automated exchange zone system 120 and/or exchange zone control computing platform 110, information notifying the user of an item exchange agreement to be used by automated exchange zone system 120 and/or exchange zone control computing platform 110 in coordinating a sale and/or other exchange of the item, and/or other information and/or controls enabling the user of user computing device 140 to view and/or define one or more parameters associated with the item.

In some instances, the user of user computing device 140 (who may, e.g., be putting the item up for sale) may utilize exchange zone control computing platform 110 and/or client portal server infrastructure 130 to receive and/or accept offers from multiple buyers for an item that includes multiple individual pieces (which may, e.g., all have been received at automated exchange zone system 120). For example, a seller may deposit a set of golf clubs at automated exchange zone system 120, and one buyer may want to purchase a putter from the set of golf clubs and another buyer may want to purchase a driver from the set of golf clubs. In such an example, exchange zone control computing platform 110 and/or client portal server infrastructure 130 may enable automated exchange zone system 120 to split the set of golf clubs to offer and/or sell the individual clubs to different buyers in separate transactions. Additionally or alternatively, exchange zone control computing platform 110 and/or client portal server infrastructure 130 may enable automated exchange zone system 120 to automatically process barter transactions (e.g., User 1 wants Item X but has Y, User 2 wants Item Y but has Z, User 3 wants Item Z but has X) by facilitating exchanges of different items between different users. Additionally or alternatively, exchange zone control computing platform 110 and/or client portal server infrastructure 130 may enable automated exchange zone system 120 to combine multiple individual items into a single transaction to offer a discount on a combined purchase (e.g., taking the example involving the set of golf clubs, exchange zone control computing platform 110 and/or client portal server infrastructure 130 may enable automated exchange zone system 120 to offer a buyer the option to purchase two clubs and receive a third club at a discount or for free, and the buyer's escrow account accordingly may be debited for the discounted amount).

Referring to FIG. 2D, at step 213, exchange zone control computing platform 110 may generate a second user interface for a user computing device linked to a second user of automated exchange zone system 120 (e.g., a user who may be a potential buyer of the item received by automated exchange zone system 120). For example, at step 213, after providing the first user interface to the first computing device (e.g., user computing device 140) linked to the first user of the automated exchange zone system (e.g., automated exchange zone system 120), exchange zone control computing platform 110 may generate a second user interface for a second computing device (e.g., user computing device 150) linked to a second user of the automated exchange zone system (e.g., automated exchange zone system 120) different from the first user of the automated exchange zone system (e.g., automated exchange zone system 120). For instance, the second user interface generated by exchange zone control computing platform 110 for user computing device 150 may include information identifying the item, information notifying the user of user computing device 150 that the item is available for purchase, information reporting the quality of the item as determined by automated exchange zone system 120 and/or exchange zone control computing platform 110, information notifying the user of user computing device 150 of the seller's terms of sale, one or more controls enabling the user of user computing device 150 to propose or counteroffer with one or more terms of sale (e.g., by defining an item exchange agreement, by selecting a predefined item exchange agreement, such as an escrow agreement, and/or the like), and/or other controls and/or information.

Figure 4:
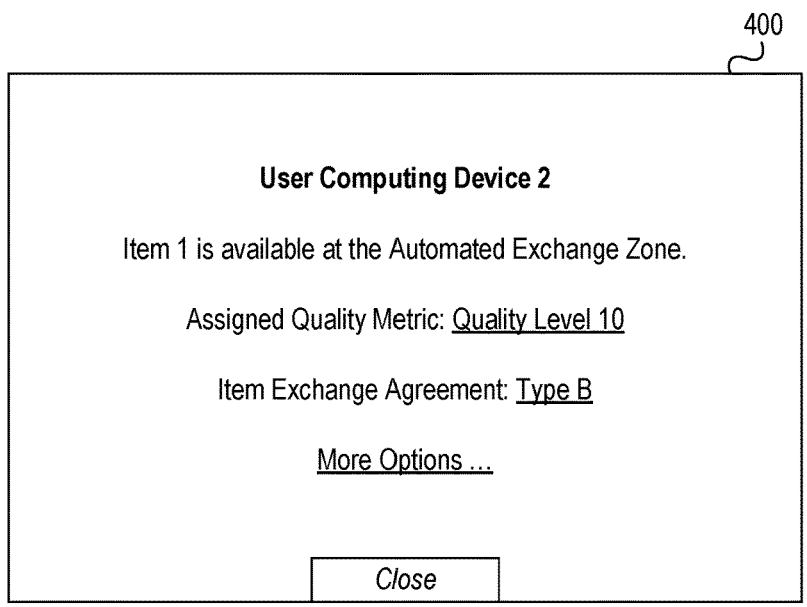

At step 214, exchange zone control computing platform 110 may provide the second user interface to user computing device 150. For example, at step 214, exchange zone control computing platform 110 may provide, via the communication interface (e.g., communication interface 113), to the second computing device (e.g., user computing device 150) linked to the second user of the automated exchange zone system (e.g., automated exchange zone system 120), the second user interface. In some instances, in providing the second user interface and/or one or more other user interfaces to user computing device 150, exchange zone control computing platform 110 may provide the user interface(s) via a client portal provided to user computing device 150 by client portal server infrastructure 130, such as an online banking portal and/or a mobile banking portal. In these instances, exchange zone control computing platform 110 may send the user interface(s) to client portal server infrastructure 130, which in turn may send and/or otherwise provide the user interface(s) to user computing device 150. In some instances, in providing the second user interface and/or one or more other user interfaces to user computing device 150, exchange zone control computing platform 110 may cause user computing device 150 to display and/or otherwise present a graphical user interface similar to graphical user interface 400, which is illustrated in FIG. 4. As seen in FIG. 4, graphical user interface 400 may include information notifying the user of user computing device 150 that the item is available at automated exchange zone system 120, information notifying the user of the quality metric assigned to the item by automated exchange zone system 120 and/or exchange zone control computing platform 110, information notifying the user of an item exchange agreement to be used by automated exchange zone system 120 and/or exchange zone control computing platform 110 in coordinating a sale and/or other exchange of the item, and/or other information and/or controls enabling the user of user computing device 150 to view and/or define one or more parameters associated with the item.

At step 215, exchange zone control computing platform 110 may generate one or more item processing commands (e.g., based on the item quality metric; based on user input received from user computing device 140 and/or user computing device 150 via one or more user interfaces; directing automated exchange zone system 120 to process the item in a particular way, such as tagging the item, dispensing the item, holding the item, or the like). For example, at step 215, exchange zone control computing platform 110 may generate, based on the item quality metric assigned to the item received by the automated exchange zone system (e.g., automated exchange zone system 120) from the first user of the automated exchange zone system (e.g., automated exchange zone system 120), one or more item processing commands directing the automated exchange zone system (e.g., automated exchange zone system 120) to process the item received by the automated exchange zone system (e.g., automated exchange zone system 120) from the first user of the automated exchange zone system (e.g., automated exchange zone system 120).

In some embodiments, generating the one or more item processing commands directing the automated exchange zone system to process the item received by the automated exchange zone system from the first user of the automated exchange zone system may include generating at least one item processing command directing the automated exchange zone system to tag the item received by the automated exchange zone system from the first user of the automated exchange zone system. For example, in generating the one or more item processing commands directing the automated exchange zone system (e.g., automated exchange zone system 120) to process the item received by the automated exchange zone system (e.g., automated exchange zone system 120) from the first user of the automated exchange zone system (e.g., automated exchange zone system 120), exchange zone control computing platform 110 may generate at least one item processing command directing the automated exchange zone system (e.g., automated exchange zone system 120) to tag the item received by the automated exchange zone system (e.g., automated exchange zone system 120) from the first user of the automated exchange zone system (e.g., automated exchange zone system 120). For instance, such a command may direct automated exchange zone system 120 apply a physical tag, such as a sticker or radiofrequency identification (RFID) tag, to the item and/or otherwise physically mark the item, such as by using a laser to engrave the item. Automated exchange zone system 120 subsequently may tag the item (e.g., after receiving the one or more item processing commands from exchange zone control computing platform 110) using one or more robotic arms and/or other computer-controlled tools included in and/or connected to automated exchange zone system 120.

In some embodiments, generating the one or more item processing commands directing the automated exchange zone system to process the item received by the automated exchange zone system from the first user of the automated exchange zone system may include generating at least one item processing command directing the automated exchange zone system to dispense the item received by the automated exchange zone system from the first user of the automated exchange zone system. For example, in generating the one or more item processing commands directing the automated exchange zone system (e.g., automated exchange zone system 120) to process the item received by the automated exchange zone system (e.g., automated exchange zone system 120) from the first user of the automated exchange zone system (e.g., automated exchange zone system 120), exchange zone control computing platform 110 may generate at least one item processing command directing the automated exchange zone system (e.g., automated exchange zone system 120) to dispense the item received by the automated exchange zone system (e.g., automated exchange zone system 120) from the first user of the automated exchange zone system (e.g., automated exchange zone system 120). For instance, such a command may direct automated exchange zone system 120 to dispense the item to a second user of automated exchange zone system 120 (who may, e.g., be the user linked to user computing device 150) based on the users of automated exchange zone system 120 agreeing to the terms of the exchange (e.g., automated exchange zone system 120 may store the item to hold the item in escrow until the users agree). Automated exchange zone system 120 subsequently may dispense the item (e.g., after receiving the one or more item processing commands from exchange zone control computing platform 110) using one or more robotic arms and/or other computer-controlled transport systems included in and/or connected to automated exchange zone system 120.

In some embodiments, generating the one or more item processing commands directing the automated exchange zone system to process the item received by the automated exchange zone system from the first user of the automated exchange zone system may include generating at least one item processing command directing the automated exchange zone system to hold the item received by the automated exchange zone system from the first user of the automated exchange zone system. For example, in generating the one or more item processing commands directing the automated exchange zone system (e.g., automated exchange zone system 120) to process the item received by the automated exchange zone system (e.g., automated exchange zone system 120) from the first user of the automated exchange zone system (e.g., automated exchange zone system 120), exchange zone control computing platform 110 may generate at least one item processing command directing the automated exchange zone system (e.g., automated exchange zone system 120) to hold the item received by the automated exchange zone system (e.g., automated exchange zone system 120) from the first user of the automated exchange zone system (e.g., automated exchange zone system 120). For instance, such a command may direct automated exchange zone system 120 to hold the item in escrow until the first user and a second of automated exchange zone system 120 (who may, e.g., be the user linked to user computing device 150) agree to the terms of an exchange. Automated exchange zone system 120 subsequently may hold the item (e.g., after receiving the one or more item processing commands from exchange zone control computing platform 110) in a computer-controlled storage compartment included in and/or connected to automated exchange zone system 120.

At step 216, exchange zone control computing platform 110 may send the one or more item processing commands to automated exchange zone system 120. For example, at step 216, exchange zone control computing platform 110 may send, via the communication interface (e.g., communication interface 113), to the automated exchange zone system (e.g., automated exchange zone system 120), the one or more item processing commands directing the automated exchange zone system (e.g., automated exchange zone system 120) to process the item received by the automated exchange zone system (e.g., automated exchange zone system 120) from the first user of the automated exchange zone system (e.g., automated exchange zone system 120).

Referring to FIG. 2E, at step 217, exchange zone control computing platform 110 may update an item tracking database (which may, e.g., be maintained by exchange zone control computing platform 110 to track any and/or all of the items received and/or exchanged at automated exchange zone system 120 and/or one or more other exchange zone systems). For example, at step 217, after sending the one or more item processing commands to the automated exchange zone system (e.g., automated exchange zone system 120), exchange zone control computing platform 110 may update an item tracking database based on the one or more item processing commands sent to the automated exchange zone system (e.g., automated exchange zone system 120).

Figure 5:
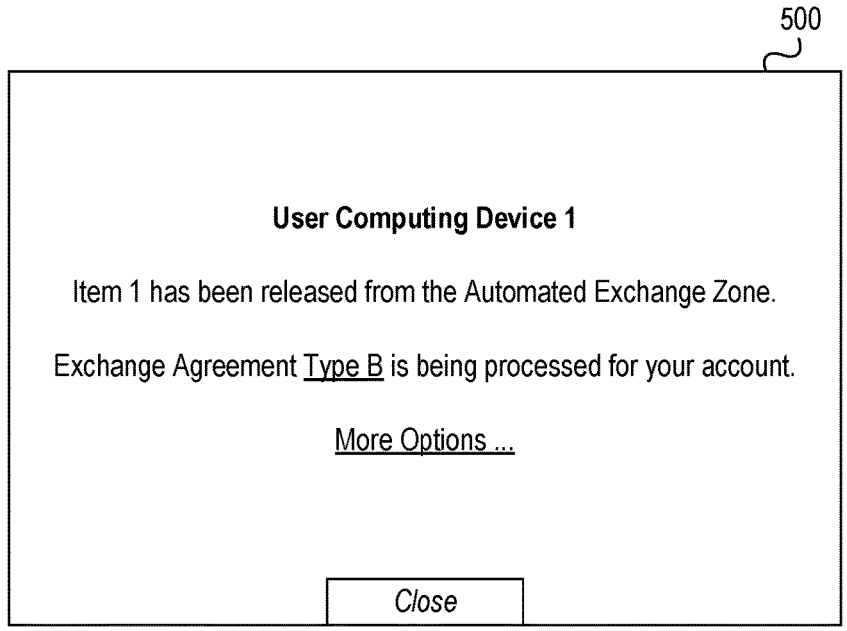

At step 218, exchange zone control computing platform 110 may generate one or more updated user interfaces (e.g., based on sending the one or more item processing commands to automated exchange zone system 120, indicating that the sale and/or exchange has been completed, indicating that funds have been deposited in the seller's account, providing the buyer with instructions for picking up the item, such as by providing the buyer with an unlock code or the like). At step 219, exchange zone control computing platform 110 may provide an updated user interface to user computing device 140. For example, after sending the one or more item processing commands to the automated exchange zone system (e.g., automated exchange zone system 120), exchange zone control computing platform 110 may provide, via the communication interface (e.g., communication interface 113), to the first computing device (e.g., user computing device 140) linked to the first user of the automated exchange zone system (e.g., automated exchange zone system 120), a first updated user interface. In some instances, in providing the updated user interface and/or one or more other user interfaces to user computing device 140, exchange zone control computing platform 110 may cause user computing device 140 to display and/or otherwise present a graphical user interface similar to graphical user interface 500, which is illustrated in FIG. 5. As seen in FIG. 5, graphical user interface 500 may include information notifying the user of user computing device 140 that the item has been released from the exchange zone, information indicating that an exchange agreement is being processed for the user's account, and/or other information and/or controls.

Figure 6:
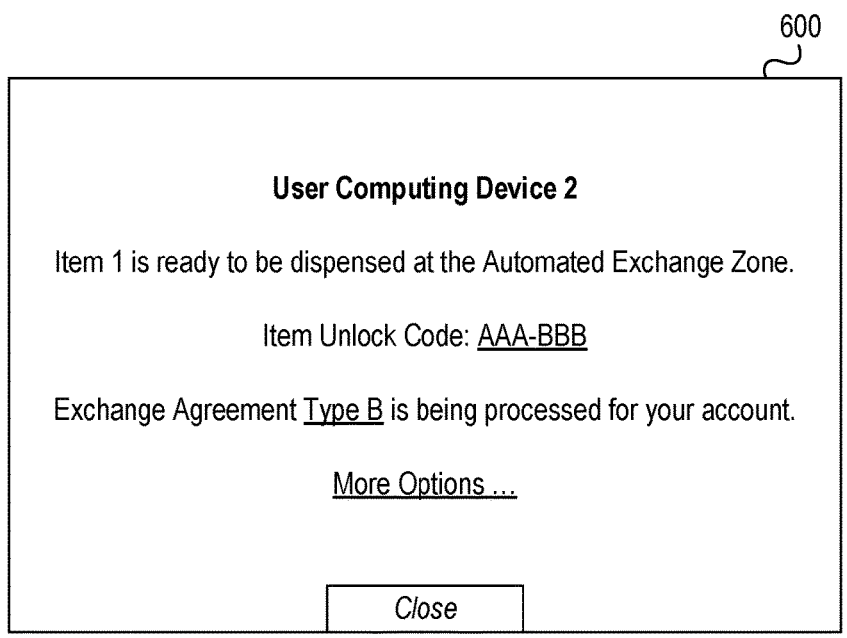

At step 220, exchange zone control computing platform 110 may provide an updated user interface to user computing device 150. For example, at step 220, exchange zone control computing platform 110 may provide, via the communication interface (e.g., communication interface 113), to the second computing device (e.g., user computing device 150) linked to the second user of the automated exchange zone system (e.g., automated exchange zone system 120), a second updated user interface. In some instances, in providing the updated user interface and/or one or more other user interfaces to user computing device 150, exchange zone control computing platform 110 may cause user computing device 150 to display and/or otherwise present a graphical user interface similar to graphical user interface 600, which is illustrated in FIG. 6. As seen in FIG. 6, graphical user interface 60 may include information notifying the user of user computing device 150 that the item is ready to be dispensed from the exchange zone, information notifying the user of user computing device 150 of a unique item unlock code (which may, e.g., be entered into automated exchange zone system 120 to cause automated exchange zone system 120 to dispense and/or otherwise release the item to the user of user computing device 150), information indicating that an exchange agreement is being processed for the user's account, and/or other information and/or controls.

Figure 7:
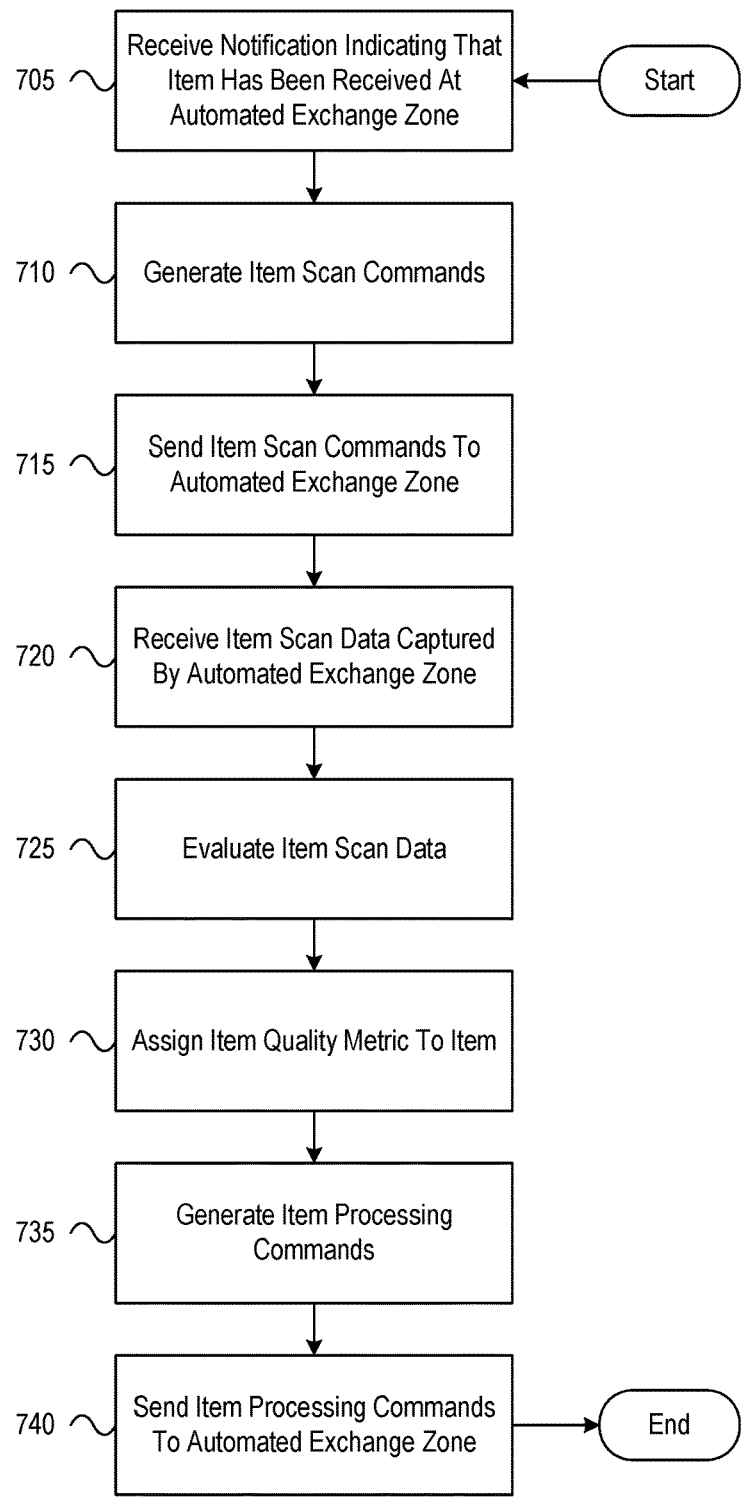
FIG. 7 depicts an illustrative method for controlling automated exchange zone systems using a digital data processing system in accordance with one or more example embodiments.

FIG. 7 depicts an illustrative method for controlling automated exchange zone systems using a digital data processing system in accordance with one or more example embodiments. Referring to FIG. 7, at step 705, a computing platform having at least one processor, a communication interface communicatively coupled to the at least one processor, and a memory storing computer-readable instructions may receive, via the communication interface, from an automated exchange zone system, a notification indicating that an item has been received by the automated exchange zone system from a first user of the automated exchange zone system. At step 710, in response to receiving the notification indicating that the item has been received by the automated exchange zone system, the computing platform may generate one or more item scan commands directing the automated exchange zone system to capture one or more scans of the item received by the automated exchange zone system from the first user of the automated exchange zone system. At step 715, the computing platform may send, via the communication interface, to the automated exchange zone system, the one or more item scan commands directing the automated exchange zone system to capture the one or more scans of the item received by the automated exchange zone system from the first user of the automated exchange zone system.

At step 720, after sending the one or more item scan commands to the automated exchange zone system, the computing platform may receive, via the communication interface, from the automated exchange zone system, item scan data captured by the automated exchange zone system. At step 725, the computing platform may evaluate the item scan data received from the automated exchange zone system based on one or more item analysis templates maintained by the computing platform. At step 730, based on evaluating the item scan data received from the automated exchange zone system, the computing platform may assign an item quality metric to the item received by the automated exchange zone system from the first user of the automated exchange zone system. At step 735, the computing platform may generate, based on the item quality metric assigned to the item received by the automated exchange zone system from the first user of the automated exchange zone system, one or more item processing commands directing the automated exchange zone system to process the item received by the automated exchange zone system from the first user of the automated exchange zone system. At step 740, the computing platform may send, via the communication interface, to the automated exchange zone system, the one or more item processing commands directing the automated exchange zone system to process the item received by the automated exchange zone system from the first user of the automated exchange zone system.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and memory storing computer-readable instructions that, when executed by the at least one processor, cause the computing platform to:

receive, via the communication interface, from an automated exchange zone system, a notification indicating that an item has been received by the automated exchange zone system from a first user of the automated exchange zone system;

in response to receiving the notification indicating that the item has been received by the automated exchange zone system, generate one or more item scan commands directing the automated exchange zone system to capture one or more scans of the item received by the automated exchange zone system from the first user of the automated exchange zone system;

send, via the communication interface, to the automated exchange zone system, the one or more item scan commands directing the automated exchange zone system to capture the one or more scans of the item received by the automated exchange zone system from the first user of the automated exchange zone system;

after sending the one or more item scan commands to the automated exchange zone system, receive, via the communication interface, from the automated exchange zone system, item scan data captured by the automated exchange zone system;

evaluate the item scan data received from the automated exchange zone system based on one or more item analysis templates maintained by the computing platform;

based on evaluating the item scan data received from the automated exchange zone system, assign an item quality metric to the item received by the automated exchange zone system from the first user of the automated exchange zone system;

generate, based on the item quality metric assigned to the item received by the automated exchange zone system from the first user of the automated exchange zone system, one or more item processing commands directing the automated exchange zone system to process the item received by the automated exchange zone system from the first user of the automated exchange zone system, wherein generating the one or more item processing commands directing the automated exchange zone system to process the item received by the automated exchange zone system from the first user of the automated exchange zone system comprises generating at least one item processing command directing the automated exchange zone system to tag the item received by the automated exchange zone system from the first user of the automated exchange zone system by using a laser to engrave the item received by the automated exchange zone system from the first user of the automated exchange zone system; and send, via the communication interface, to the automated exchange zone system, the one or more item processing commands directing the automated exchange zone system to process the item received by the automated exchange zone system from the first user of the automated exchange zone system.

2. The computing platform of claim 1, wherein generating the one or more item scan commands directing the automated exchange zone system to capture the one or more scans of the item received by the automated exchange zone system from the first user of the automated exchange zone system comprises generating at least one item scan command directing the automated exchange zone system to capture a three-dimensional scan of the item received by the automated exchange zone system from the first user of the automated exchange zone system.

3. The computing platform of claim 1, wherein generating the one or more item scan commands directing the automated exchange zone system to capture the one or more scans of the item received by the automated exchange zone system from the first user of the automated exchange zone system comprises generating at least one item scan command directing the automated exchange zone system to capture an infrared scan of the item received by the automated exchange zone system from the first user of the automated exchange zone system.

4. The computing platform of claim 1, wherein generating the one or more item scan commands directing the automated exchange zone system to capture the one or more scans of the item received by the automated exchange zone system from the first user of the automated exchange zone system comprises generating at least one item scan command directing the automated exchange zone system to capture an x-ray scan of the item received by the automated exchange zone system from the first user of the automated exchange zone system.

5. The computing platform of claim 1, wherein receiving the item scan data captured by the automated exchange zone system comprises receiving scan data identifying one or more physical features of the item received by the automated exchange zone system from the first user of the automated exchange zone system.

6. The computing platform of claim 1, wherein evaluating the item scan data received from the automated exchange zone system based on the one or more item analysis templates maintained by the computing platform comprises evaluating the item scan data received from the automated exchange zone system based on external data associated with an external data source system.

7. The computing platform of claim 1, wherein generating the one or more item processing commands directing the automated exchange zone system to process the item received by the automated exchange zone system from the first user of the automated exchange zone system comprises generating at least one item processing command directing the automated exchange zone system to dispense the item received by the automated exchange zone system from the first user of the automated exchange zone system.

8. The computing platform of claim 1, wherein generating the one or more item processing commands directing the automated exchange zone system to process the item received by the automated exchange zone system from the first user of the automated exchange zone system comprises generating at least one item processing command directing the automated exchange zone system to hold the item received by the automated exchange zone system from the first user of the automated exchange zone system.

9. The computing platform of claim 1, wherein the memory stores additional computer-readable instructions that, when executed by the at least one processor, cause the computing platform to:

after sending the one or more item processing commands to the automated exchange zone system, update an item tracking database based on the one or more item processing commands sent to the automated exchange zone system.

10. The computing platform of claim 1, wherein the memory stores additional computer-readable instructions that, when executed by the at least one processor, cause the computing platform to:
   after assigning the item quality metric to the item received by the automated exchange zone system from the first user of the automated exchange zone system, generate a first user interface for a first computing device linked to the first user of the automated exchange zone system; and
   provide, via the communication interface, to the first computing device linked to the first user of the automated exchange zone system, the first user interface.

11. The computing platform of claim 10, wherein the memory stores additional computer-readable instructions that, when executed by the at least one processor, cause the computing platform to:
   after providing the first user interface to the first computing device linked to the first user of the automated exchange zone system, generate a second user interface for a second computing device linked to a second user of the automated exchange zone system different from the first user of the automated exchange zone system; and
   provide, via the communication interface, to the second computing device linked to the second user of the automated exchange zone system, the second user interface.

12. The computing platform of claim 11, wherein the memory stores additional computer-readable instructions that, when executed by the at least one processor, cause the computing platform to:
   after sending the one or more item processing commands to the automated exchange zone system, provide, via the communication interface, to the first computing device linked to the first user of the automated exchange zone system, a first updated user interface; and
   provide, via the communication interface, to the second computing device linked to the second user of the automated exchange zone system, a second updated user interface.

13. A method, comprising:
   at a computing platform comprising at least one processor, memory, and a communication interface:
      receiving, by the at least one processor, via the communication interface, from an automated exchange zone system, a notification indicating that an item has been received by the automated exchange zone system from a first user of the automated exchange zone system;
      in response to receiving the notification indicating that the item has been received by the automated exchange zone system, generating, by the at least one processor, one or more item scan commands directing the automated exchange zone system to capture one or more scans of the item received by the automated exchange zone system from the first user of the automated exchange zone system;
      sending, by the at least one processor, via the communication interface, to the automated exchange zone system, the one or more item scan commands directing the automated exchange zone system to capture the one or more scans of the item received by the automated exchange zone system from the first user of the automated exchange zone system;
      after sending the one or more item scan commands to the automated exchange zone system, receiving, by the at least one processor, via the communication interface, from the automated exchange zone system, item scan data captured by the automated exchange zone system;
      evaluating, by the at least one processor, the item scan data received from the automated exchange zone system based on one or more item analysis templates maintained by the computing platform;
      based on evaluating the item scan data received from the automated exchange zone system, assigning, by the at least one processor, an item quality metric to the item received by the automated exchange zone system from the first user of the automated exchange zone system;
      generating, by the at least one processor, based on the item quality metric assigned to the item received by the automated exchange zone system from the first user of the automated exchange zone system, one or more item processing commands directing the automated exchange zone system to process the item received by the automated exchange zone system from the first user of the automated exchange zone system, wherein generating the one or more item processing commands directing the automated exchange zone system to process the item received by the automated exchange zone system from the first user of the automated exchange zone system comprises generating at least one item processing command directing the automated exchange zone system to tag the item received by the automated exchange zone system from the first user of the automated exchange zone system by using a laser to engrave the item received by the automated exchange zone system from the first user of the automated exchange zone system; and
      sending, by the at least one processor, via the communication interface, to the automated exchange zone system, the one or more item processing commands directing the automated exchange zone system to process the item received by the automated exchange zone system from the first user of the automated exchange zone system.

14. The method of claim 13, wherein generating the one or more item scan commands directing the automated exchange zone system to capture the one or more scans of the item received by the automated exchange zone system from the first user of the automated exchange zone system comprises generating at least one item scan command directing the automated exchange zone system to capture a three-dimensional scan of the item received by the automated exchange zone system from the first user of the automated exchange zone system.

15. The method of claim 13, wherein generating the one or more item scan commands directing the automated exchange zone system to capture the one or more scans of the item received by the automated exchange zone system from the first user of the automated exchange zone system comprises generating at least one item scan command directing the automated exchange zone system to capture an infrared scan of the item received by the automated exchange zone system from the first user of the automated exchange zone system.

16. The method of claim 13, wherein generating the one or more item scan commands directing the automated exchange zone system to capture the one or more scans of the item received by the automated exchange zone system from the first user of the automated exchange zone system comprises generating at least one item scan command directing the automated exchange zone system to capture an x-ray scan of the item received by the automated exchange zone system from the first user of the automated exchange zone system.

17. The method of claim 13, wherein receiving the item scan data captured by the automated exchange zone system comprises receiving scan data identifying one or more physical features of the item received by the automated exchange zone system from the first user of the automated exchange zone system.

18. The method of claim 13, wherein evaluating the item scan data received from the automated exchange zone system based on the one or more item analysis templates maintained by the computing platform comprises evaluating the item scan data received from the automated exchange zone system based on external data associated with an external data source system.

19. One or more non-transitory computer-readable media storing instructions that, when executed by a computing platform comprising at least one processor, memory, and a communication interface, cause the computing platform to:
  receive, via the communication interface, from an automated exchange zone system, a notification indicating that an item has been received by the automated exchange zone system from a first user of the automated exchange zone system;
  in response to receiving the notification indicating that the item has been received by the automated exchange zone system, generate one or more item scan commands directing the automated exchange zone system to capture one or more scans of the item received by the automated exchange zone system from the first user of the automated exchange zone system;
  send, via the communication interface, to the automated exchange zone system, the one or more item scan commands directing the automated exchange zone system to capture the one or more scans of the item received by the automated exchange zone system from the first user of the automated exchange zone system;
  after sending the one or more item scan commands to the automated exchange zone system, receive, via the communication interface, from the automated exchange zone system, item scan data captured by the automated exchange zone system;
  evaluate the item scan data received from the automated exchange zone system based on one or more item analysis templates maintained by the computing platform;
  based on evaluating the item scan data received from the automated exchange zone system, assign an item quality metric to the item received by the automated exchange zone system from the first user of the automated exchange zone system;
  generate, based on the item quality metric assigned to the item received by the automated exchange zone system from the first user of the automated exchange zone system, one or more item processing commands directing the automated exchange zone system to process the item received by the automated exchange zone system from the first user of the automated exchange zone system, wherein generating the one or more item processing commands directing the automated exchange zone system to process the item received by the automated exchange zone system from the first user of the automated exchange zone system comprises generating at least one item processing command directing the automated exchange zone system to tag the item received by the automated exchange zone system from the first user of the automated exchange zone system by using a laser to engrave the item received by the automated exchange zone system from the first user of the automated exchange zone system; and
  send, via the communication interface, to the automated exchange zone system, the one or more item processing commands directing the automated exchange zone system to process the item received by the automated exchange zone system from the first user of the automated exchange zone system.

* * * * *